United States Patent
Kim et al.

(10) Patent No.: US 7,861,220 B2
(45) Date of Patent: Dec. 28, 2010

(54) METHOD FOR GENERATING ADAPTIVE USAGE ENVIRONMENT DESCRIPTOR OF DIGITAL ITEM

(75) Inventors: Do-Nyun Kim, Seoul (KR); Yong-Hyun Park, Yongin-si (KR); Young-Won Song, Seoul (KR)

(73) Assignee: LG Electronics Inc., Seoul (KR)

( * ) Notice: Subject to any disclaimer, the term of this patent is extended or adjusted under 35 U.S.C. 154(b) by 1580 days.

(21) Appl. No.: 10/428,948

(22) Filed: May 5, 2003

(65) Prior Publication Data

US 2003/0208375 A1 Nov. 6, 2003

(30) Foreign Application Priority Data

May 6, 2002 (KR) .................. 10-2002-0024878

(51) Int. Cl.
*G06F 9/44* (2006.01)
*G06F 17/00* (2006.01)
(52) U.S. Cl. .................. 717/109; 717/106; 717/107; 717/113; 345/418
(58) Field of Classification Search .................. 717/105, 717/114; 707/102
See application file for complete search history.

(56) References Cited

U.S. PATENT DOCUMENTS

| 6,212,550 | B1 * | 4/2001 | Segur | 709/206 |
|---|---|---|---|---|
| 6,243,681 | B1 * | 6/2001 | Guji et al. | 704/260 |
| 6,317,795 | B1 | 11/2001 | Malkin et al. | 709/246 |
| 6,683,987 | B1 * | 1/2004 | Sugahara | 382/235 |
| 6,813,489 | B1 * | 11/2004 | Wu et al. | 455/412.1 |
| 2002/0095429 | A1 * | 7/2002 | Song et al. | 707/104.1 |
| 2002/0138495 | A1 * | 9/2002 | Chang et al. | 707/102 |
| 2003/0156108 | A1 * | 8/2003 | Vetro | 345/418 |

FOREIGN PATENT DOCUMENTS

| EP | 1 225 520 | 7/2002 |
|---|---|---|
| KR | 10-1999-13974 A | 2/1999 |
| KR | 10-2001-70867 A | 7/2001 |
| KR | 10-2001-92449 A | 10/2001 |
| WO | WO 00/28440 | 5/2000 |

OTHER PUBLICATIONS

ISO/IEC JTC1/SC29/WG11 N3500, Sep. 3, 2000.*
ISO/IEC JTC1/SC29/WG11/N3825, Jan. 19, 2001.*

(Continued)

*Primary Examiner*—Tuan Q Dam
*Assistant Examiner*—Isaac T Tecklu
(74) *Attorney, Agent, or Firm*—KED & Associates LLP

(57) ABSTRACT

There is provided a method for generating an adaptive usage environment descriptor that considers a usage environment of a digital item. In a description of multimedia contents based on usage environment descriptor and user preference descriptor of the multimedia contents, a "PrecedencePreference" is defined in respective usage environment descriptor of the digital item, or an "AlternativePreference" is defined in descriptors of the digital item, or the "AlternativePreference" and the "PrecedencePreference" are simultaneously defined in a description of an adaptation condition to adaptively modify and describe the digital item.

5 Claims, 5 Drawing Sheets

OTHER PUBLICATIONS

ISO/IEC JTC1/SC29/WG11 N3971, Mar. 23, 2001.*
Iverson et al., ISO/IEC JTC 1/SC 29/WG 11, Mar. 2001.*
European Search Report dated Mar. 28, 2008.
XP-002472927; MPEG-21 Digital Item Declaration WD; ISO/IEC 2000; Vaughn Iverson et al; Mar. 2001, Singapore.
XP-002472926; Personal Digital Libraries and Knowledge Management; David Hicks et al.; Journal of Universal Computer Science; vol. 7, No. 7, Jul. 28, 2001, pp. 550-565.
Hicks, D., et al., "Personal Digital Libraries and Knowledge Management," *Journal of Universal Computer Science*, (2001), 7:7:550-565.

* cited by examiner

METHOD FOR GENERATING ADAPTIVE USAGE ENVIRONMENT DESCRIPTOR OF DIGITAL ITEM

BACKGROUND OF THE INVENTION

1. Field of the Invention

The present invention relates to a digital item adaptation, particularly to a method for generating an adaptive usage environment descriptor of the digital item.

2. Description of the Related Art

In activities related to an electronic commerce, such as creation, production, transaction, transmission, management, storage and consumption of multimedia data, there have been demands for flexible, transparent and augmented use of multimedia resources.

Specifically, considering a tendency to widely use an electronic commerce with an advance of Internet, a non-existence of a declaration model for the treatment unit of the multimedia data used in the electronic commerce is a latent factor that may cause a confusion of the electronic commerce.

In consideration of these points, a declaration of the digital item is stipulated in MPEG-21 of an international standard organization ISO/IEC SC29/WG11, maximally taking consideration into users of an electronic commerce business model (the users includes all subjects related to the electronic commerce, such as digital item creator, provider, distributor, consumer, intellectual property right holder, financial service provider, electronic commerce supervisor, and the like). There has been an attempt to make the digital item to be an international standard that is flexible, coherent and compatible on the basis of relationship between the subjects of the electronic commerce or their associated descriptions.

Accordingly, there have been demands for a declaration model of the digital item, which can consider relationship between the subjects (or users) of business model configuration in the electronic commerce or the associated descriptions and achieve the electronic commerce without regard to kinds of networks or terminals.

The declaration model of such a digital item should have a compatibility, a coherence and flexibility as a minimum unit of multimedia data in the activities of the electronic commerce, such as creation, production, transaction, transmission, management, storage and consumption of the multimedia data used for the electronic commerce.

The digital item is a fundamental unit of whole activities, such as creation, production, transaction, transmission, management, storage and consumption of the multimedia contents that are valuable as an intellectual property under wired/wireless environments. Generally, the digital item consists of three components. In other words, the digital item can include: a RESOURCE (for example, movie or music itself) which is an individual asset or content; a DESCRIPTOR (for example, title of movie or music, genre, name of author, summary of contents, usage conditions, or regulation of the contents) describing the contents and their usages; and configurational elements (for example, "CHOICE", "SELECTION" and "CONDITION") configuring the digital item.

In addition to the resource itself, the digital item can further include metadata. The metadata contains a DESCRIPTOR describing the resource, a SELECTION element that can be selected by the user, a CHOICE element that is a bundle of SELECTION elements, and each of the SELECTION element and the CHOICE element contains a CONDITION element that represents validity under a specific condition. Additionally, the digital item includes many COMPONENTS (an actual resource (music file or graphic file) and a DESCRIPTOR). Among them, in order to make it possible for the user to select desired COMPONENT and configure suitable digital item, the digital item and the COMPONENT contain the CONDITION element that requires a specific condition set by the user. Specifically, the CONDITION refers to the SELECTION element. If the SELECTION element selected by the user exists in the reference list, the corresponding CONDITION is "true", and if not, it is "false".

As described above, the CHOICE element describes a set of related SELECTION elements, and the CONDITION element describes pre-satisfied conditions.

Many digital items that are previously generated are reconfigured to generate new digital items (composite digital items)

For example, image digital items are configured to generate a composite digital item, which is called an album. In that case, each of the image digital items is an external storage digital item existing in an independent storage unit. In order to contain the image digital items, the new album digital item contains REFERENCES that are accessible to them.

Additionally, in case the desired digital items are configured using the CONDITION elements, an efficient representation of the CONDITION is an important factor that determines an efficiency of comparative operation and a capability to represent the CONDITION. There is a demand for an efficient representation of the CONDITION, which considers characteristics of condition comparison objects.

FIG. 1 illustrates a structure of a declaration model of a digital item.

As shown in FIG. 1, the digital item is described with a DECLARATION, a CONTAINER and an ITEM in a Digital Item Declaration Language (DIDL).

A COMPONENT includes a RESOURCE such as audio, video, graphic and text, an ANCHOR indicating the RESOURCE, and a DESCRIPTOR describing the COMPONENT. An ITEM is a grouping of sub-ITEMS and/or COMPONENTS. Also, A CONTAINER is a structure that allows ITEMS and/or CONTAINERS to be grouped.

FIG. 1 shows that the digital item can include other digital items, and a reference component accessible to an external storage digital item is defined in the digital item.

The digital item shows a mechanism that can select desired configuration using the CHOICE element and the SELECTION element. Additionally, the user can configure desired digital item by using the CONDITION element. An efficient representation of the CONDITION is an important factor that determines an efficiency of comparative operation and a capability to represent the CONDITION. Accordingly, it can be seen that there is a demand for an efficient representation of the CONDITION, which considers characteristics of a condition comparison object.

As described above, it is necessary to provide a description that can make the user experience various multimedia contents in the most optimum state according to various usage environments. In other words, it is necessary to provide a description that can make the user experience the multimedia in the most optimum state according to a capability of user terminal, a capability of network, a capability of a delivery layer, a user characteristic such as preference and gender, a natural environment characteristic, and a capability of provided service. For the purpose of these descriptions, a Digital Item Adaptation (DIA) should basically provide a descriptor on the usage environment.

On the basis of the requirements, various usage environment descriptors should be described or processed to cope with the tendency that various multimedia contents are provided and usage environments of the contents are extensively varied. Accordingly, there is a demand for a method of generating a descriptor that defines which environment descriptor is preferred among various and mass environment descriptors in the digital item adaptation. Additionally, an "AlternativePreference" descriptor is required as second best policy for the environment descriptors determined by the preference.

In other words, in the latter case, there is a demand for a method of providing second best contents for the required contents by defining the descriptor that provides a criteria of the alternative selection of the environment descriptor corresponding to the environment descriptor selected by the digital item adaptation.

SUMMARY OF THE INVENTION

Accordingly, the present invention is directed to a method for generating an adaptive usage environment descriptor of a digital item that substantially obviates one or more problems due to limitations and disadvantages of the related art.

It is an object of the present invention to provide a basis for enabling various users, who have various demands under various environments, to use optimized multimedia contents by describing a "PrecedencePreference" between usage environment descriptors of the digital item.

It is another object of the present invention to provide a basis for enabling various users, who have various demands under various environments, to use more optimized multimedia contents by describing an "AlternativePreference" as second best policy of the environment descriptors determined by a "PrecedencePreference" between usage environment descriptors of the digital item.

Additional advantages, objects, and features of the invention will be set forth in part in the description which follows and in part will become apparent to those who have ordinary skills in the art upon examination of the following or may be learned from practice of the invention. The objectives and other advantages of the invention may be realized and attained by the structure particularly pointed out in the written description and claims hereof as well as the appended drawings.

According to an embodiment of the present invention, in a description of multimedia contents based on usage environment descriptor and user preference descriptor of the multimedia contents, an adaptive usage environment descriptor of a digital item is generated by defining a "PrecedencePreference" in respective usage environment descriptor of the digital item.

According to another embodiment of the present invention, in a description of multimedia contents based on usage environment descriptor and user preference descriptor of the multimedia contents, an adaptive usage environment descriptor of a digital item is generated by defining an "AlternativePreference" in descriptors of the digital item.

According to further another embodiment of the present invention, in a description of multimedia contents based on usage environment and user preference of the multimedia contents, an adaptive usage environment descriptor of a digital item is generated by defining a "PrecedencePreference" in respective usage environment descriptors of the digital item, and defining an "AlternativePreference" in describing an adaptation condition to adaptively modify and describe the digital item.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to preferred embodiments of the present invention with reference to the attached drawings.

Figure 1:
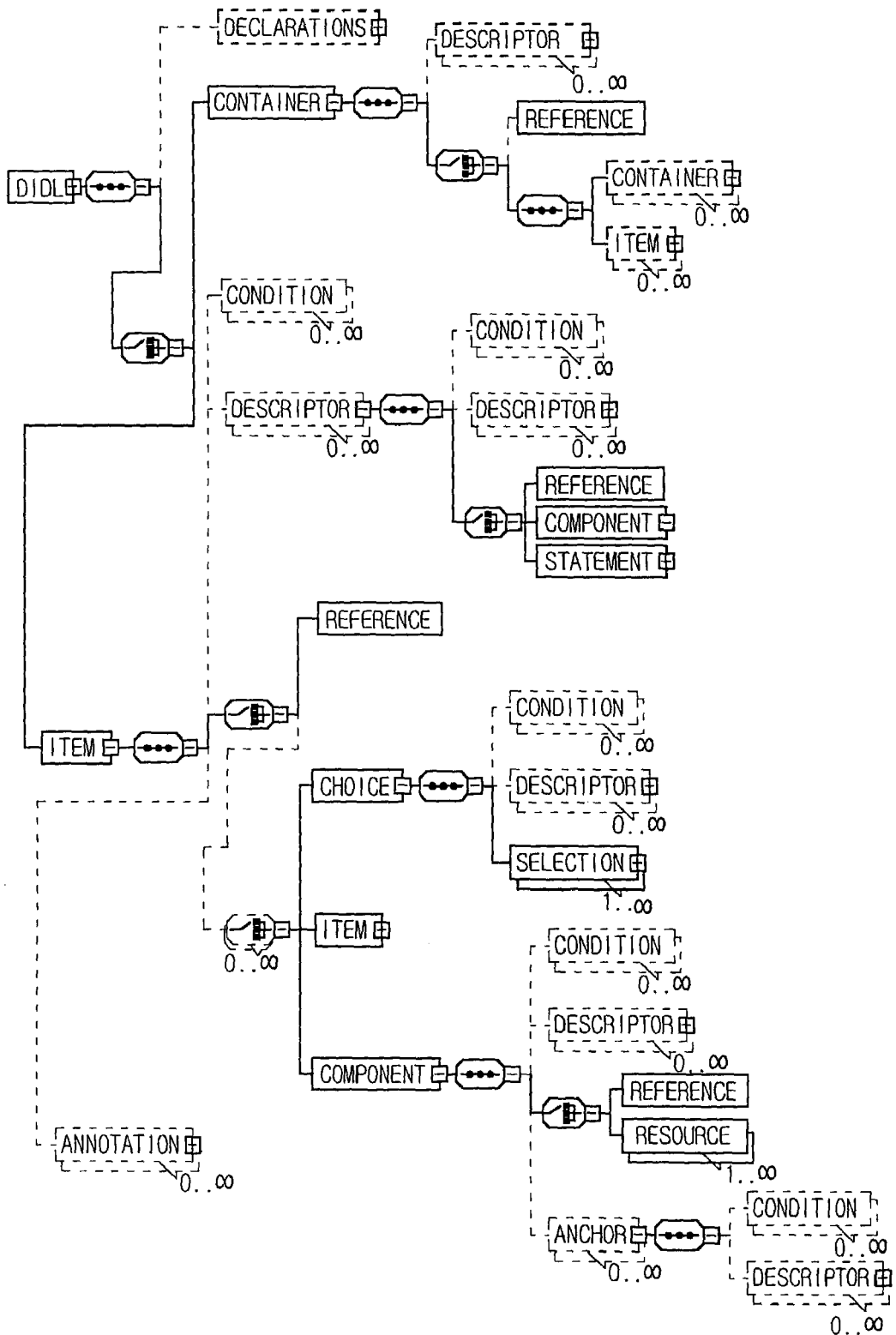
FIG. 1 illustrates a structure of a declaration model of a digital item.
Figure 2:
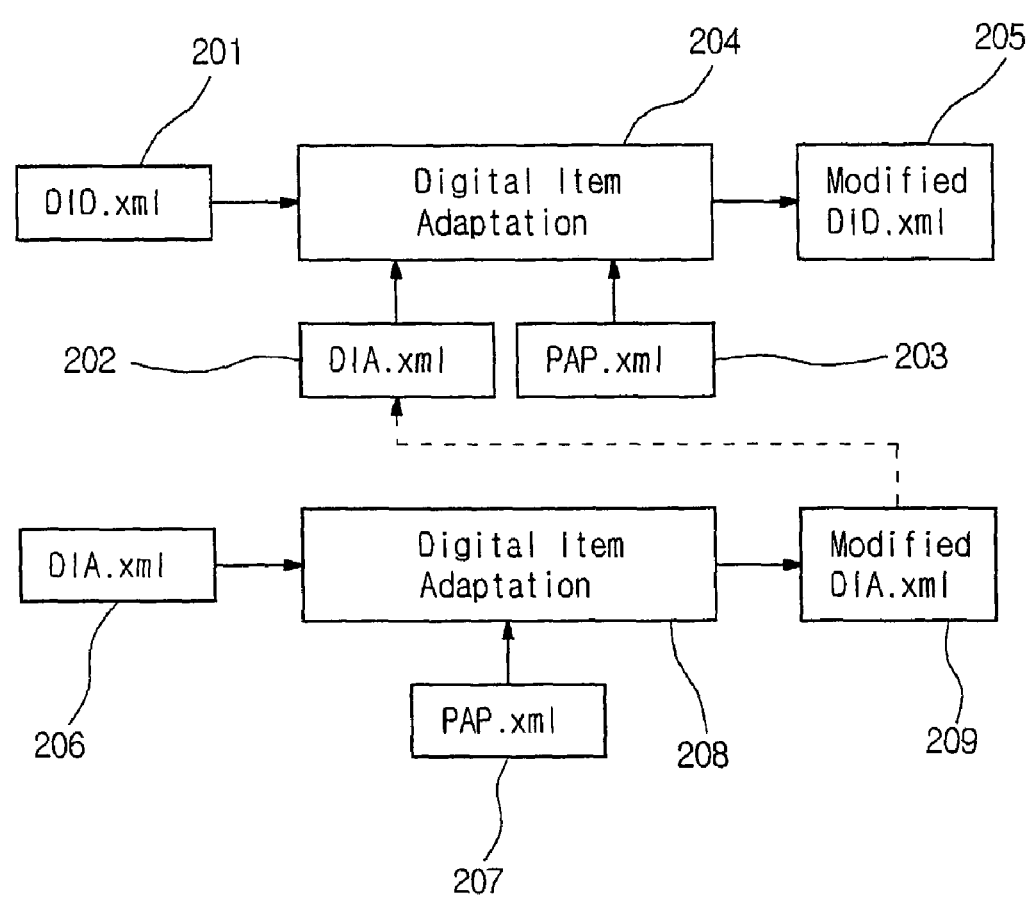
FIG. 2 illustrates a generation of an adaptive digital item according to the present invention.

FIG. 2 illustrates a process of generating an adaptive digital item according to the present invention. Referring to FIG. 2, the adaptive generation of the digital item is achieved by two steps interacting each other or operating independently.

A DID.xml 201 is an extensible markup language (XML) format of a digital item declaration (DID). The DID.xml 201 represents a digital item to which an adaptation is not yet applied. The digital item (DID.xml) is provided to an input of a digital item adaptation block 204. A DIA.xml 202 is an XML format of a digital item adaptation (DIA), and a PAP.xml 203 is an XML format of a "PrecedencePreference"/"AlternativePreference"(PAP).

The digital item adaptation block 204 receives the DID.xml 201, the DIA.xml 202 and the PAP.xml 203 to generate a modified DID.xml 205 that is most suitable for usage environment and preference.

Meanwhile, although such an environment descriptor or preference descriptor can be used to modify the digital item (DID.xml), the environment descriptor or the preference descriptor can be applied after being modified in an adaptation type by the/"PrecedencePreference" descriptor or the "AlternativePreference" descriptor according to the present invention.

In other words, a digital item adaptation block 208 describes a DIA.xml 206 and a PAP.xml 207 in a form of modified DIA.xml 209 using the environment descriptor (DIA.xml) or the preference descriptor (PAP.xml), and the digital item adaptation block 204 receives the modified DIA.xml 209 to generate the modified DID.xml that is most suitable for the usage environment and the preference.

Accordingly, the method according to the present invention can be achieved by two steps interacting each other or operating independently.

Embodiment 1

Figure 3:
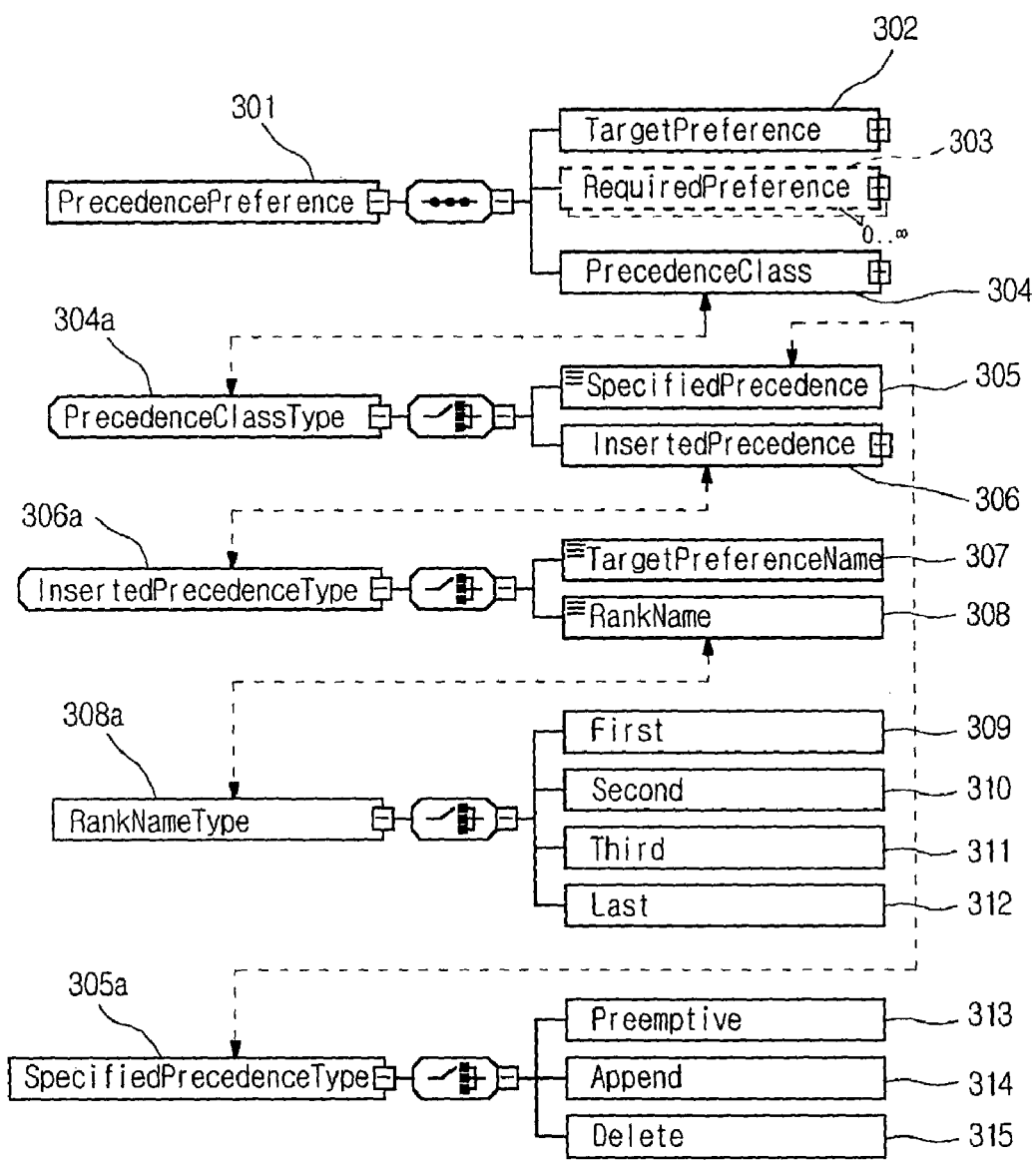
FIG. 3 illustrates a generation of a digital item descriptor using a "PrecedencePreference" descriptor according to an embodiment of the present invention.

FIG. 3 illustrates a method of generating an adaptive usage environment descriptor of a digital item according to the first embodiment of the present invention. FIG. 3 shows an example describing precedence preference between usage environment descriptors.

FIG. 3 shows how to adaptively describe various usage environment descriptors so as to give maximum satisfaction when the user uses multimedia contents based on the preference for several usage environments. Specifically, FIG. 3 shows how to adaptively describe multimedia contents (i.e., the digital items) so as to give maximum satisfaction when the user uses multimedia contents based on the preference for several usage environments.

As shown in FIG. 3, a "PrecedencePreference" descriptor 301 is described in an adaptation of the digital item. The "PrecedencePreference" descriptor 301 can be used to describe which is considered as higher (or lower) precedence among the usage environment descriptors. Also, the "PrecedencePreference" descriptor 301 can be used to classify the environment descriptors into high precedence and low precedence. Therefore, it allows the user to concentrate on more important information and change the precedence without receiving already described environment variable values any more. Consequently, efficiency in the reproduction of contents can be enhanced.

The "PrecedencePreference" descriptor 301 is defined by a "TargetPreference" descriptor 302, a "RequiredPreference" 303 of the "TargetPreference" descriptor 302, and a "PrecedenceClass" 304.

The "PrecedenceClass" 304 is described by a "PrecedenceClassType" 304a, which is defined by a "SpecifiedPrecedence" 305 and an "InsertedPrecedence" 306.

The "SpecifiedPrecedence" 305 is defined by a "SpecifiedPrecedenceType" 305a. The "SpecifiedPrecedenceType" 305a is defined by a "Preemptive" 313, an "Append" 314 and a "Delete" 315.

The "Preemptive" 313 discards the previous precedence and all environment descriptors that are under consideration, and changes the precedence by considering only new "TargetPreference", i.e., new environment descriptor. The "Append" 314 changes the "TargetPreference", i.e., the target environment descriptor, to the lowest precedence among the environment descriptors that are under consideration. The "Delete" 315 changes the precedence while not considering the "TargetPreference", i.e., the target environment descriptor.

The "InsertedPrecedence" 306 describing the "PrecedenceClassType" 304a is defined by the "InsertedPrecedenceType" 306a. The "InsertedPrecedenceType" 306a is defined by a "TargetPreferenceName" 307 and a "RankName" 308. The "TargetPreferenceName" 307 describes a method of considering highly a usage environment precedence inserted into the front of the name. For example, a preference is specified higher than a preference that the "TargetPreferenceName" has, and the precedence is specified by inserting a preference name having a high preference into the front portion. The inserting method using the preference name is to specify a relative precedence.

Unlike the "TargetPreferenceName" 307, a preference inserting method using the "RankName" 308 is to specify an absolute precedence. The designation of the absolute precedence is defined by a "RankNameType" 308a. The "RankNameType" 308a is described by a method of designating a "First" 309, a "Second" 310, a "Third" 311, . . . , and a "Last" 312.

Embodiment 2

Figure 4:
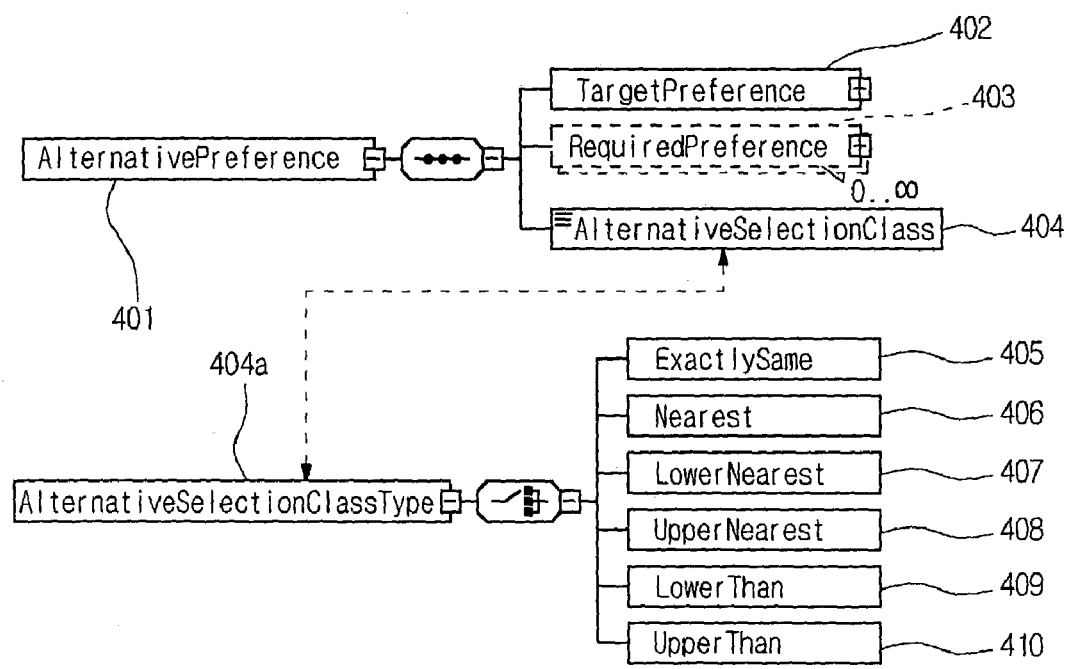
FIG. 4 illustrates a generation of a digital item descriptor using an "AlternativePreference" descriptor according to an embodiment of the present invention.

FIG. 4 illustrates a method of generating an adaptive usage environment descriptor of a digital item according to the second embodiment of the present invention. FIG. 4 shows a description of an alternative selection that can be used as the second best policy, in case multimedia contents and the digital item are not suitable for requirements of the environment descriptor in describing an adaptation condition for the digital item adaptation using the environment descriptor.

As shown in FIG. 4, an "AlternativePreference" descriptor 401 is described in an adaptation of the digital item. The "AlternativePreference" descriptor 401 makes it possible to select the second best policy on environment descriptors determined by the precedence. Therefore, it provides various users having various demands under various environments with a basis of optimized usage of multimedia contents.

The "AlternativePreference" descriptor 401 is defined by a "TargetPreference" descriptor 402, a "RequiredPreference" 403 of the "TargetPreference" descriptor 402, and an "AlternativeSelectionClass" 404.

The "AlternativeSelectionClass" 404 is described by an "AlternativeSelectionClassType" 404a.

The "AlternativeSelectionClassType" 404a is defined by a case 405 of selecting an exactly same value ("ExactlySame"), a case 406 of selecting the nearest value ("Nearest"), a case 407 of selecting a nearest value among values lower than a designated value ("LowerNearest"), a case 408 of selecting a nearest value among values higher than the designated value ("UpperNearest"), a case 409 of selecting values lower than the designated value ("LowerThan"), and a case 410 of selecting values higher than the designated value ("UpperThan").

Embodiment 3

Figure 5:
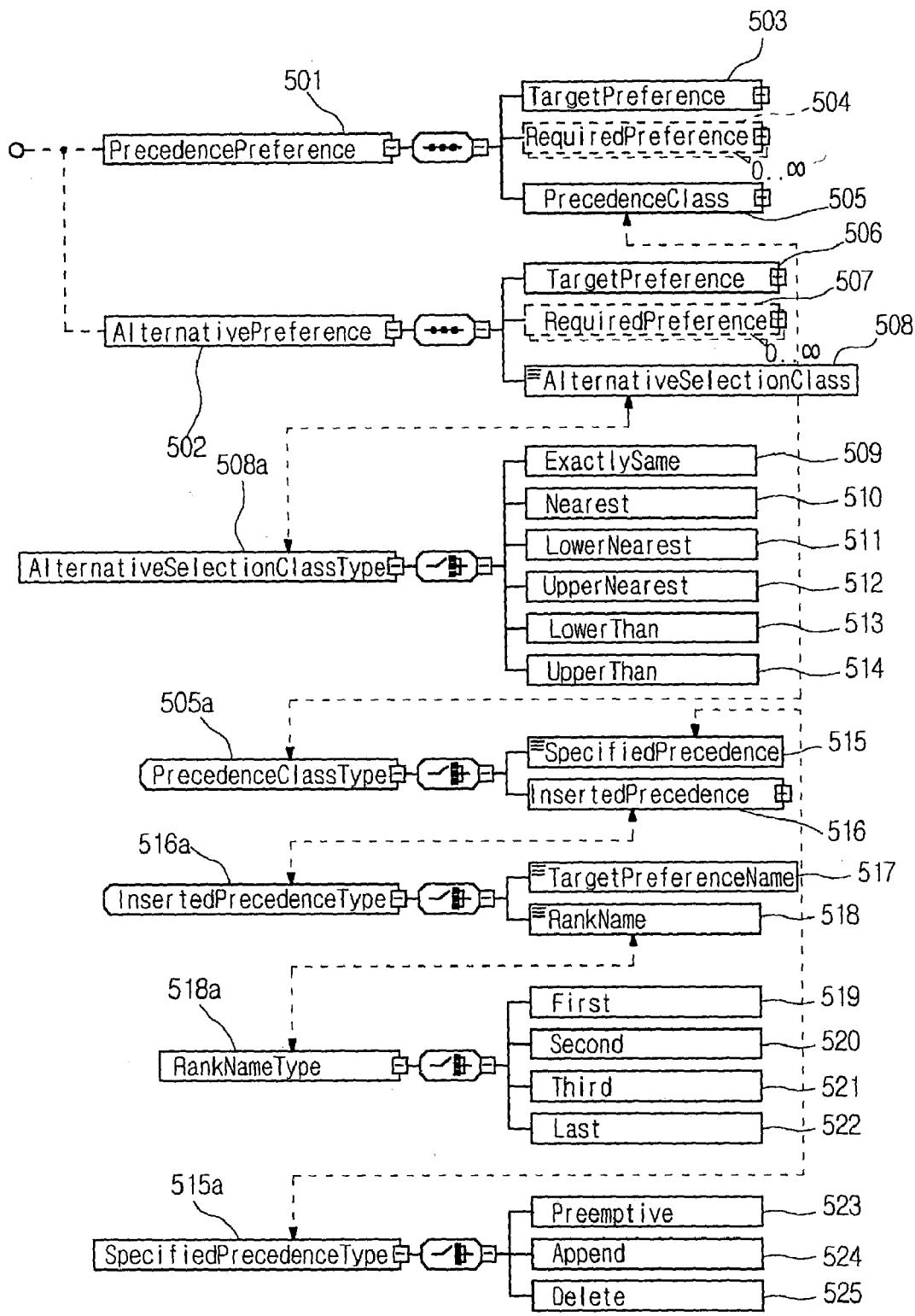
FIG. 5 illustrates a generation of a digital item using both a "PrecedencePreference" descriptor and an "AlternativePreference" descriptor according to an embodiment of the present invention.

FIG. 5 illustrates a method of generating an adaptive usage environment descriptor of a digital item according to third embodiment of the present invention. The method according to the third embodiment of the present invention is characterized in that a "PrecedencePreference" is described in usage environment descriptors of the digital item and an "AlternativePreference" is described with respect to environment descriptors determined by the aforementioned precedence, when multimedia contents are described based on their usage environment descriptor and preference descriptor.

As shown in FIG. 5, a "PrecedencePreference" descriptor 501 and an "AlternativePreference" descriptor 502 are described in an adaptation of the digital item. The "PrecedencePreference" descriptor 501 makes it possible to describe precedence for usage environment descriptors. Additionally, the method according to the third embodiment of the present invention can provide basis of an alternative selection as the second best policy in case the environment descriptors according to the precedence are not suitable for requirements.

The "PrecedencePreference" descriptor 501 can be used to describe which is considered as higher (or lower) precedence among the usage environment descriptors. Also, the "PrecedencePreference" descriptor 501 can be used to classify the environment descriptors into high precedence and low precedence. Therefore, it makes the user concentrate on more important information and the precedence can be changed without receiving already described environment variable values any more. Consequently, efficiency in the reproduction of contents can be enhanced. Additionally, an alternative selection can be achieved as the second best policy by the "AlternativePreference" descriptor 502 in case multimedia contents and the digital item are not suitable for requirements of the environment descriptor.

The "PrecedencePreference" descriptor 501 is defined by a "TargetPreference" descriptor 503, a "RequiredPreference" 504 of the "TargetPreference" descriptor 503, and a "PrecedenceClass" 505.

The "PrecedenceClass" 505 is described by a "PrecedenceClassType" 505a, which is defined by a "SpecifiedPrecedence" 515 and an "InsertedPrecedence" 516.

The "SpecifiedPrecedence" 515 is described by a "SpecifiedPrecedenceType" 515a. The "SpecifiedPrecedenceType" 515a is defined by a "Preemptive" 523, an "Append" 524 and a "Delete" 525.

The "Preemptive" 523 discards the previous precedence and all environment descriptors that are under consideration, and changes the precedence by considering only new "TargetPreference", i.e., new environment descriptor. The Append 524 changes the "TargetPreference", i.e., the target environment descriptor, to the lowest precedence among the environment descriptors that are under consideration. The "Delete" 525 changes the precedence while not considering the target precedence, i.e., the target environment descriptor.

The "InsertedPrecedence" 516 describing the "PrecedenceClassType" 505a is defined by the "InsertedPrecedenceType" 516a. The "InsertedPrecedenceType" 516a is defined by a "TargetPreferenceName" 517 and a "RankName" 518. The "TargetPreferenceName" 517 describes a method of considering usage environment precedence inserted into the front of the name. For example, a preference is designated higher than a preference that the "TargetPreferenceName" has, and the precedence is designated by inserting a preference name having a high preference into the front portion. The inserting method using the preference name is to designate a relative precedence.

Unlike the "TargetPreferenceName" 517, a preference inserting method using the "RankName" 518 is to designate an absolute precedence. The designation of the absolute precedence is defined by a "RankNameType" 518a. The "RankNameType" 518a is described by a method of designating a "First" 519, a "Second" 520, a "Third" 521, ..., and a "Last" 522.

The "AlternativePreference" descriptor 502 is defined by a "TargetPreference" descriptor 506, a "RequiredPreference" 507 for the "TargetPreference" descriptor 506, and an "AlternativeSelectionClass" 508.

The "AlternativeSelectionClass" 508 is described by an "AlternativeSelectionClassType" 508a.

The "AlternativeSelectionClassType" 508a is defined by a case 509 of selecting an exactly same value ("ExactlySame"), a case 510 of selecting the nearest value ("Nearest"), a case 511 of selecting a nearest value among values lower than a designated value ("LowerNearest"), a case 512 of selecting a nearest value among values higher than the designated value ("UpperNearest"), a case 513 of selecting values lower than the designated value ("LowerThan"), and a case 514 of selecting values higher than the designated value ("UpperThan").

As described above, when multimedia contents are adaptively described according to usage environment descriptor and user preference descriptor, the usage environment descriptor is adaptively modified and described using the "PrecedencePreference" descriptor and the "AlternativePreference" descriptor. Accordingly, when using the multimedia contents, i.e., the digital items, it is possible to achieve an appropriate adaptive modification description with respect to dynamically changing usage environment, as well as various users who are under various environments. Further, according to the present invention, high-level multimedia contents to satisfy the users can be provided.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for generating digital contents including a descriptor, the method comprising:
    defining a characteristic descriptor describing characteristics associated with the digital contents;
    defining first preference information associated with the characteristic descriptor, the first preference information indicating a relative priority of the characteristic descriptor;
    defining a usage environment descriptor describing a usage environment;
    defining second preference information associated with the usage environment descriptor, the second preference information indicating a relative priority of the usage environment descriptor; and
    generating digital contents including the characteristic descriptor, the usage environment descriptor and the first and second preference information.

2. The method of claim 1, wherein the second preference information is defined for each usage environment descriptor.

3. The method of claim 1, wherein the second preference information indicates a higher or lower preference among usage environment descriptors.

4. The method of claim 1, further comprising:
    defining an alternative preference information associated with the usage environment descriptor, the alternative preference information indicating alternative preferences on the usage environment descriptor determined by the second preference information, wherein the digital contents further include the alternative preference information.

5. The method of claim 1, wherein the usage environment descriptor provides at least one of a capability of user terminal, a capability of network, a capability of a delivery layer, a user characteristic, a natural environment characteristic and a capability of provided service.

* * * * *